ANALOG TO DIGITAL CONVERTERS

Original Filed Jan. 7, 1966 2 Sheets-Sheet 1

INVENTORS
ROGER CHARBONNIER
STEPHANE ESTRABAUD
BY Arnold & Roylance
ATTORNEYS

ANALOG TO DIGITAL CONVERTERS

Original Filed Jan. 7, 1966 2 Sheets-Sheet 2

INVENTORS
ROGER CHARBONNIER
STEPHANE ESTRABAUD

BY Arnold & Roylance
ATTORNEYS

United States Patent Office 3,480,949

Patented Nov. 25, 1969

3,480,949
ANALOG TO DIGITAL CONVERTERS

Roger Charbonnier, Meudon, and Stephane Estrabaud, Antony, France, assignors to Societe d'Instrumentation Schlumberger, Paris, France, a French corporation Continuation of application Ser. No. 519,280, Jan. 7, 1966. This application Jan. 10, 1969, Ser. No. 796,272
Claims priority, application France, Jan. 8, 1965, 1,344
Int. Cl. R041 *3/00*; H03k *13/00*
U.S. Cl. 340—347 11 Claims

ABSTRACT OF THE DISCLOSURE

An analog to digital converter employs an integrating circuit which integrates a rectified modulated alternating current signal for a measured time period equal to an integral submultiple of the alternating current frequency. The integrator is then discharged through a known resistance and a counter counts gated oscillator pulses until the integrator reaches a predetermined level. The count in the counter is therefore a measure of the modulating analog signal.

Figure 1:
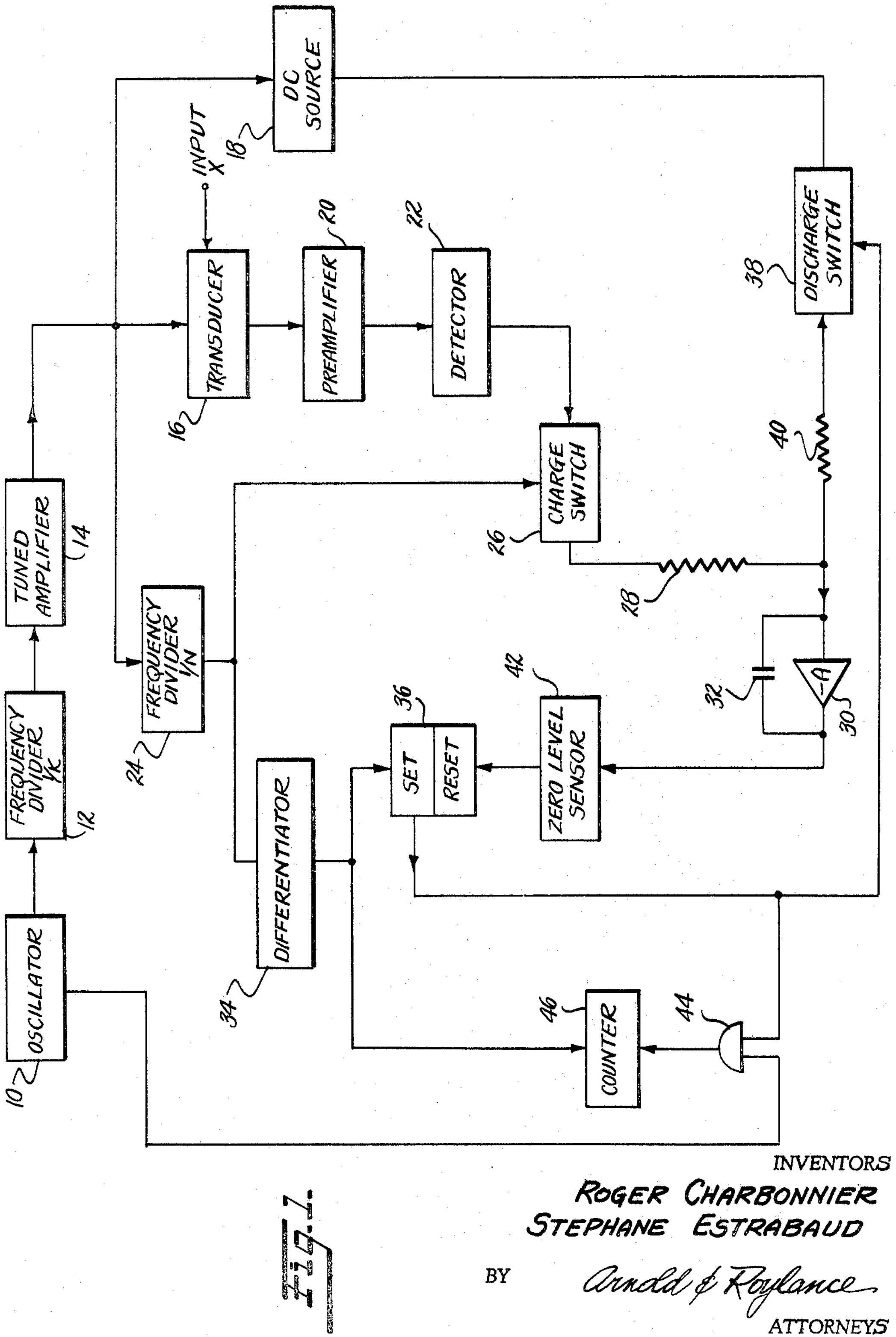

This is a continuation of application Ser. No. 519,280, filed Jan. 7, 1966, and now abandoned.

This invention relates to electronic converter systems and more particularly to analog to digital converter apparatus for converting an analog input voltage or current into digital form.

The problems to which the preferred embodiment of this invention are directed relate to conversion of signals derived from some form of transducer supplied with an alternating current which provides a varying electrical signal, the amplitude of which is a function of some physical quantity. Examples of these are differential transformers, potentiometers, or bridge circuits including elements of variable resistance such as strain gauges, photoresistive cells, or the elements of resistance thermometers.

One prior art approach to the conversion of this type of information from analog form to digital form is known as the method of successive trials, wherein the analog alternating voltage which is to be converted to digital form is compared with a series or alternating voltages or currents, the amplitudes of which are caused to decrease by successive factors of two. This approach suffers from a substantial speed disadvantage because an appreciable period of time is required for each successive comparison. Also, the accuracy of the calculation is limited by the degree of precision which can be imputed to the resistances and transformers providing the reference voltage with which the unknown voltage is compared. A further disadvantage is inherent in the controlled phase relationships between the unknown signal and the reference signal. The latter disadvantage can be compensated for, but doing so requires that the equipment be unduly complicated.

Another prior art approach includes converting the alternating signal into a direct current signal by using rectification and filtering equipment, and then converting the filtered signal into digital form, such as by a chopping process. The approach also suffers from the disadvantage of slowness, the low pass filter causing a delay in transmission and preventing rapid conversion of the information, this being a considerable disadvantage where, for example, multiple input signals must be encoded successively and switched to a common output conductor. This approach is also subject to the disadvantage that conversion error is introduced if the reference supply voltage varies.

An object of this invention is therefore to provide an apparatus capable of converting an alternating analog signal into digital form rapidly and precisely wherein the conversion accuracy is independent of the supply voltages and the frequencies of the system components.

Another object of the present invention is to provide an apparatus wherein the analog output from a transducer, which is supplied from a source of alternating current at a substantially fixed frequency, is used to charge a capacitor within a preselected period of time, and wherein a counting circuit is gated open only during the discharge time of the capacitor to a preselected voltage level, and a source of clock pulses to the counting circuit is thereby counted to provide a digital indication of the magnitude of the analog voltage.

Briefly described, a preferred embodiment of the apparatus incorporating the subject invention includes a source of alternating current at a preselected fixed frequency, this source being used to excite the transducer. The physical quantity operating on the transducer causes the alternating current to be modulated in accordance with changes in the physical quantity, the output of the transducer then being converted into a pulsating unidirectional current still retaining the information characteristics of the quantity. The pulsating current is supplied to an integrator circuit including a capacitor and a charging resistor having known constants. The pulsating current is supplied to the integrator for a measured time period which is an integral submultiple of the supply frequency. The capacitor is thereby charged within that time period to a voltage which is a function of the analog voltage. The pulsating direct current is then disconnected from the capacitor, and the accumulated charge is discharged through a known resistance to a known voltage level, that voltage level being proportional to the average value of the AC supply current. Gating circuits are provided to allow clock pulses from the oscillator AC source to pass to a counter circuit during the period of time required to discharge the capacitor to a preselected level, the number of pulses provided to the counter circuit being a measure of the level to which the capacitor was charged. The number of pulses counted by the counter circuit is therefore a measure of the analog voltage derived from the transducer. The accuracy of the system is enhanced by the use of frequency dividers which provide an alternating voltage to the transducer which is a significant submultiple of the clock pulses provided to the counter.

In order that the maner in which the foregoing and other objects are attained in accordance with the invention can be understood in detail, a particularly advantageous embodiment thereof will be described with reference to the accompanying drawings which form a part of this specification and wherein;

FIG. 1 is a schematic block diagram of an apparatus in accordance with the invention; and FIGS. 2*a–e* illustrate wave forms occurring at various points in the system of FIG. 1.

In the following description, particular frequencies and division ratios will be used by way of example to facilitate explanation and understanding. It will be understood that the numerical values used are examples to facilitate explanation and understanding and that the system can be modified by one skilled in the art to employ any values suitable for the particular transducer or ultimate use equipment with which the system is to be employed.

An oscillator 10, which can be of any conventional design, and which is tuned to produce alternating current at a frequency of 256 kilocycles per second, is connected to the input terminal of a frequency divider circuit 12 and to one of the two input terminals of a gate circuit 44, which can be a conventional logic circuit known to those skilled in the art as an AND circuit. In an AND circuit, an output signal appears only when each input terminal is provided with an appropriate input signal. Divider circuit 12 is similarly a conventional circuit, and is designed to have a division ratio $1/K$, K in this example being equal to 64. The output of divider 12, which is at a frequency of 4 kc., is connected to the input terminal of an amplifier 14, which is a tuned amplifier tuned to the divided frequency of four kilocycles per second. The amplified 4 kc. signal is connected to the input terminal of another frequency divider 24, and also to the input terminal of a transducer 16 and to a direct current source 18. Frequency divider 24 is a conventional divider similar to divider 12, but has a ratio of $1/N$, N in this case being equal to 8, so that the output of divider 24 is 500 cycles per second.

Divider 24 is of a type which, in addition to dividing the frequency supplied thereto by the prescribed factor, produces an output signal which is a rectangular wave, having substantially vertical leading and trailing edges. The square wave characteristics of this output signal facilitate the switching functions performed by circuits to be later described.

Direct current source 18 is used to provide a reference voltage level in the capacitor discharging function to be described later. It should be noted here, however, that source 18 derives its supply from the 4 kc. signal, and that the DC level established at its output terminal is a function of the average value of the 4 kc. signal so that, if the amplitude of that signal varies, this variation will be automatically compensated for.

Transducer 16 is the circuit element providing the analog voltage function which is to be converted to digital information. The transducer can be one of the general types discussed above, the physical entity being measured being indicated by input X. It will be recognized that the input need not be a physical quantity in the sense of temperature or pressure, but can also be a voltage which is subject to a periodic variation and which is to be digitalized.

Designating the alternating current signal provided to the input of the transducer as $E_p$, it will be recognized that the transducer output will be modulated by the input X to provide a quantity $E_pX$. This signal is provided to a preamplifier 20 and then to a double alternating detection stage 22 which converts the signal to a pulsating direct current signal. The magnitude of the signal at this point is equal to $E_pX$ multiplied by a constant factor B, B representing the transfer functions of the preamplifier and detector stages.

The output of detector 22 is connected to the input terminal of a charge switch 26. Charge switch 26 can be any of a number of conventional circuit elements broadly characterized as relays, these including electromagnetic relays as well as any of a number of semiconductor switching elements or logic circuit elements. Switch 26 is characterized by having a switchable current path which does not modify the signal carried by this path, the conductive state of that path being controlled by a control element, the control element in this case being connected to the output terminal of frequency divider 24. The output terminal of switch 26 is connected to one terminal of a resistance 28, the other terminal of which is connected to the input terminal of an operational amplifier 30. Resistance 28 is also connected via a resistance 40 to the input terminal of a discharge switch 38, the output terminal of which is connected to the output terminal of DC source 18. Discharge switch 38 is similar in its characteristics to switch 26, in that the condition of a switchable path therethrough is controlled by an input signal provided to a control element.

Operational amplifier 30 is provided with a capacitor 32 connected between the input and output terminals of the amplifier to form an integrator circuit commonly known to those skilled in the art as a "Miller" integrator. The output of amplifier 30 is connected to the input of a zero level sensor, on zero crossing sensor 42, which is designed to provide an output pulse whenever the level of the voltage appearing at its input terminal reaches a zero voltage level. The output of level sensor 42 is connected to the reset input terminal of a bistable circuit 36.

The output terminal of frequency divider 24, in addition to being connected to the control terminal of charge switch 26, is connected to the input terminal of a differentiating circuit 34. Differentiator 34 is of the type which provides a negative pulse timed to coincide with the trailing edge of a square wave signal provided at its input terminal. The output of differentiator 34 is connected to the set input of bistable circuit 36, and also to one input terminal of a counter circuit 46. The output of bistable circuit 36 is taken from the SET side, and is connected to the other input terminal of AND circuit 44, and also to the control terminal of the discharge switch 38.

The timing functions and signal flow of the above described apparatus can be best described by reference to FIGS. *2a–2e* which show the wave forms occurring at various points in the circuit. As described above, the output of frequency divider 24 is a rectangular wave train of a frequency equal to the frequency of the oscillator divided by the constant denominators of dividers 12 and 24, in this case being 500 cycles per second. At that frequency, the period of time between a leading edge and the next successive trailing edge of a pulse is equal to one millisecond, this wave form being shown in FIG. *2a*. It will be recognized that during that one millisecond interval, the oscillator 10 produces, and supplies to the gate circuit, 256 complete alternations. Also, during that one millisecond period, the output of transducer 16 includes four complete alternations. Thus, the output of detector 22, which provides a full wave rectified version of the transducer output, produces eight pulses, all of the same polarity but modulated in amplitude in accordance with the input X. Charge switch 26 is turned on by each positive half-cycle of the output of frequency divider 24, and is turned off by each negative half-cycle. Thus, during its "on" cycle, charge switch 26 allows eight pulses, all of the same polarity, to pass to charging resistor 28 as shown by FIG. *2b*, and to integrating amplifier 30 and its capacitor 32. The voltage appearing at the output of amplifier 30 is therefore an irregularly increasing voltage as shown in FIG. *2c*, the result of integrating the output pulses of detector 22. When the output of divider 24 switches to its negative half-cycle, charge switch 26 is again closed, preventing further passage of pulses from detector 22 and terminating the increasing charge on capacitor 32.

Simultaneously, differentiator 34 produces a negative pulse coincident in time with the trailing edge of the positive rectangular wave from divider 24, this negative pulse being provided to the SET input of bistable circuit 36, placing it in the SET state. The negative pulse from differentiator 34 is also provided to counter 46 to place the counter in an enabled state. The output of bistable circuit 36 accomplishes two functions, one being to place discharge switch 38 in a closed or conductive condition commencing the discharge of capacitor 32 toward the voltage level provided by DC circuit 18. Capacitor 32 is thereby discharged at a constant current rate, illustrated by the linear decrease in voltage from the charge level attained by capacitor 32 during the integration period, this discharge illustrated in FIG. *2c* by the portion of the curve indicated at T.

As mentioned earlier, the DC voltage provided at the output terminal of circuit 18 is a function of the average signal output of amplifier 14. The rate of discharge of capacitor 32 is clearly a function of the value of resistance 40 and the voltage appearing at the output terminal of source 18. The level to which capacitor 32 is charged is partly a function of the amplitude of the AC supply exciting transducer 16. Thus, if the average amplitude of the AC supply were to decrease, the full charge voltage on capacitor 32 would not rise to the level expected, and if that capacitor were then discharged to a negative fixed reference level it would do so in a time less than the proper time T, and the count registered by counter 46 would be erroneously low. However, by causing the reference level to also change in proportion to the AC average amplitude, the time T is retained properly as a function only of the modulating force X, and the count registered by counter 46 will always be a proper measure in digital form of analog function X.

The second function performed by the set output from bistable circuit 36 is to provide the second input to gate circuit 44. The first input, it will be recalled, was provided by an input from oscillator 10. The sequence of pulses from oscillator 10 is now allowed to pass to the counting input of counter 46. Each such cycle is now counted by counter 46, this counting proceeding for as long as bistable circuit 36 remains in its SET state.

Figure 2A:
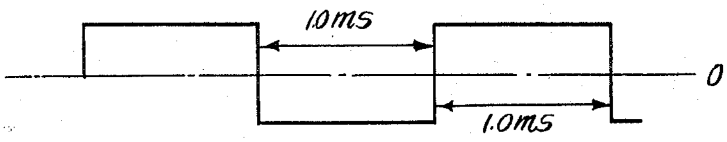
Figure 2B:
Figure 2C:
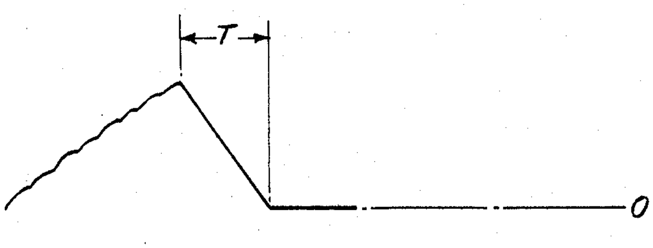
Figure 2D:
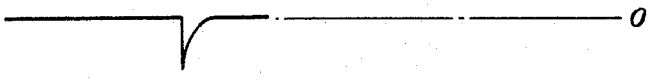
Figure 2E:
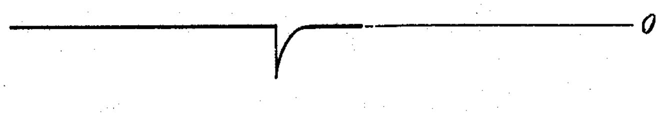

When the voltage at the output of amplifier 30 reaches a zero level, indicated at the end of the "T" of FIG. 2*c*, this fact is detected by zero level sensor 42 and a negative pulse is provided to the reset input of bistable circuit 36. This pulse is shown in FIG. 2*e*, coincident in time with the end of the discharge period T shown in FIG. 2*c*. At that time, bistable circuit 36 is returned to its RESET state, and the SET output returns to a zero or negative level, again disabling gate circuit 44 and opening, or placing in a nonconductive state, the discharge switch 38. Charging is terminated and the system is ready for a new charging and counting cycle. As will be recognized, this cycle recommences at the end of the negative portion of the rectangular wave form shown in FIG. 2*a*, one millisecond after the discharge period of capacitor 32 began.

With the precise timing periods involved as described in the above sequence of operations, it will be clear that the counter circuit is allowed to count a number of complete cycles proportional to the magnitude of the charge accumulated by capacitor 32, this charge having been established as a function of the amplitudes of the uniform polarity pulses provided by the detector circuitry following the transducer, these amplitudes in turn being a function of the modulation of the alternating current excitation of transducer 16 by the input X. It will be clear that, although the basic oscillator frequency or other characteristics of the system might change, the counting performed will remain a function of the transducer output and therefore of the input X. The particular frequencies involved and the particular numbers of pulses integrated, or the numbers counted, may be clearly changed by modifying the basic frequencies designed into the system without changing the characteristics of the system as to accuracy and reliability.

While one advantageous embodiment has been chosen to illustrate the invention, it will be understood by those skilled in the art that various changes and modifications can be made therein without departing from the scope of the invention as defined in the appended claims.

What is claimed is:

1. An apparatu s for converting an analog signal to digital form comprising the combination of a source of alternating current energy having a substantially fixed frequency; transducer means energized by the AC energy from said source and responsive to an externally supplied variable for modulating said AC energy to provide at an output terminal an analog signal characterized by variations in amplitude related to said variable; detector means for accepting the modulated signal from said transducer means and converting said signal to a modulated unidirectional signal; storage means for accepting a varying unidirectional signal and establishing a potential level which is a function of the time-amplitude characteristics of said unidirectional signal; controlled switch means having a conductive state and a nonconductive state, said switch means being connected between said detector means and said storage means for providing said unidirectional signal from said detector means to said storage means when said switch means is in said conductive state; control circuit means for controlling the conductive state of said switch means to place said switch means in a conductive state for a time equal to an integral multiple of cycles of the AC energy from said source; means for decreasing the potential level established in said storage means at a constant rate; and means for measuring the time required to diminish said stored potential to a predetermined lower level.

2. An apparatus according to claim 1 wherein said storage means comprises an integrator circuit including an amplifier having an input terminal and an output terminal, and a capacitor connected between the input and output terminals of said amplifier.

3. Apparatus according to claim 1 wherein said control circuit means comprises frequency divider circuit means connected beetween said source of alternating current energy and said switch means for providing to said switch meeans a signal having a frequency which is an integral submultiple of the frequency of the signal generated by said source.

4. Apparatus according to claim 1 wherein said switch means comprises a current path switchable between a conductive state and a nonconductive state, and control means to control the state of said path, said control means having a control terminal; and said control circuit means comprises frequency divider circuit means for accepting the output of said source and for providing to said control terminal a signal at a frequency which is an integral submultiple of the frequency of the signal from said source.

5. Apparatus according to claim 2 wherein said means for decreasing the potential level established in said storage means comprises a constant current load; and second controlled switch means and resistance means connected in series circuit relationship between said capacitor and said constant current load.

6. Apparatus according to claim 1 wherein said time measuring means further comprises pulse counter circuit means having an input terminal; gate circuit means having an output terminal and two input terminals, said gate circuit output terminal being connected to said counter circuit input terminal; circuit means for connecting one of said gate input terminals to the output of said AC energy source; and circuit means for sensing said stored potential and for providing a signal to the other of said gate input terminals until the potential reaches said predetermined level.

7. An analog-to-digital converting apparatus comprising the combination of signal generating circuit means for providing an AC voltage at a substantially constant frequency F; first frequency divider circuit means for accepting the output of said signal generating circuit means and for providing an output AC voltage at a frequency which is an integral submultiple $F/K$ of said frequency F; transducer means for accepting said output of said frequency divider circuit means and an externally provided signal and for modulating said frequency divider circuit output with said externally provided signal; detecting circuit means connected to the output of said transducer means for rendering said modulated signal unidirectional; a capacitor; a charging circuit for said capacitor; controlled switch means included in said charging circuit for selectivley connecting and disconnecting the output of said detecting circuit means to said capacitor, said switch means having a control element to which control signals can be applied to control the conductive state of said switch means; second frequency divider circuit means for accepting the output of said first frequency divider circuit means and for producing an output signal having a frequency $F/KN$, where N is an integer; circuit means interconnecting the output of said second frequency divider circuit means and said control element of said switch means for passing the output of said detecting circuit means to said capacitor for a time equal to the period of a cycle of alternating current having a frequency $F/KN$; bistable circuit means having a SET state and a RESET state, and a SET input terminal and a RESET input terminal, and an output terminal; level sensing circuit means connected to said capacitor and to the RESET input terminal of said bistable circuit means for providing a RESET pulse to said RESET terminal when the voltage across said capacitor reaches a preselected level; differentiator circuit means connected to said second frequency divider circuit means and to the SET input terminal of said bistable circuit means for providing a SET pulse to said SET input terminal whenever said controlled switch means is rendered nonconductive; second controlled switch means having a switchable conductive path and a control element; a discharge circuit for said capacitor for discharging said capacitor at a controlled, constant rate, said discharge circuit including said switchable path of said second switch means; gate circuit means having an output terminal and two input terminals, for providing an output at said output terminal when signals are simultaneously applied to both said input terminals, one said input terminal being connected to the output of said signal generating circuit means; said output terminal of said bistable circuit means being connected to the control element of said second switch means and to the other input terminal of said gate circuit means; and a counter having an input terminal connected to the output terminal of said gate circuit means, said counter being operative to register all pulses provided to said gate circuit means from said signal generating circuit means during the conductive period of said gate circuit means.

8. An apparatus for converting an analog signal into digital form where the analog signal is derived from a transducer device excited by alternating current comprising the combination of means for detecting the analog signal, means for integrating the detected signal for a period of time equal to a whole number of cycles of the exciting alternating current, a capacitor included in said integrator means, said capacitor being adapted to store energy supplied by the detected signal during said integrating period, means for discharging said capacitor at a constant current rate proportional to the amplitude of the exciting alternating current, means for measuring the time required to discharge said capacitor to a predetermined voltage level, and means included in said last mentioned means for displaying said interval of time in digital form.

9. Apparatus according to claim 8 wherein said displaying means comprises counter circuit means; gate circuit means having two input terminals and an output terminal, said output terminal being connected to the input of said counter circuit means; a source of clock pulses; circuit means connecting said source of clock pulses to one input terminal of said gate circuit means; circuit means for providing an enabling signal to the other input terminal of said gate circuit means during the period of time required for the discharge of said capacitor.

10. An apparatus for converting an analog signal to digital form comprising the combination of a source of alternating current energy having a substantially fixed frequency; transducer means energized by the AC energy from said source and responsive to an externally supplied force for modulating said AC energy to provide at an output terminal an analog signal characterized by variations in amplitude related to said force; storage means for accepting said modulated signal and establishing a potential level which is a function of the time-amplitude characteristics of said signal; controlled switch means having a conductive state and a nonconducting state, said switch means being connected between said transducer means and said storage means for connecting said signal means to said storage means when said switch means is in said conductive state; control circuit means for controlling the conductive state of said switch means to place said switch means in a conductive state for a time equal to an integral multiple of cycles of the AC energy from said source; means for decreasing the potential level established in said storage means at a constant rate; and means for measuring the time required to diminish said stored potential to a predetermined lower level.

11. An apparatus for converting an analog signal into digital form where the analog signal is derived from a transducer device excited by time varying cyclic current, the apparatus comprising the combination of means for detecting the analog signal, means for integrating the detected signal for a period of time equal to a whole number of cycles of the exciting current, a capacitor included in said means for integrating, said capacitor being adapted to store energy supplied by the detected signal during said integrating period, means for discharging said capacitor at a constant current rate proportional to the magnitude of the exciting current, and means for measuring the time required to discharge said capacitor to a predetermined voltage level.

References Cited

UNITED STATES PATENTS

| | | | |
|---|---|---|---|
| 2,950,052 | 8/1960 | Knox. | |
| 3,051,939 | 8/1962 | Gilbert | 340—347 |
| 3,316,547 | 4/1967 | Ammann. | |

FOREIGN PATENTS

| | | |
|---|---|---|
| 897,946 | 6/1962 | Great Britain. |

OTHER REFERENCES

Schmid and Grindle, "Pulse-Width Modulator," Electronics, Oct. 11, 1963, vol. 36, No. 41, pp. 29–31.

MAYNARD R. WILBUR, Primary Examiner

M. K. WOLENSKY, Assistant Examiner.

U.S. Cl. X.R.

235—183